INVENTOR.
John R. Gier, Jr.,
BY Gehr & Leonard,
his ATTORNEYS.

March 24, 1959  J. R. GIER, JR  2,878,560
METHOD OF MAKING COMPOSITE LIGHT WEIGHT STRUCTURAL ELEMENTS
Filed Jan. 10, 1955  2 Sheets-Sheet 2

INVENTOR.
John R. Gier, Jr.
BY
Gehr & Leonard,
his ATTORNEYS

United States Patent Office 2,878,560
Patented Mar. 24, 1959

2,878,560

METHOD OF MAKING COMPOSITE LIGHT WEIGHT STRUCTURAL ELEMENTS

John R. Gier, Jr., Cleveland, Ohio

Application January 10, 1955, Serial No. 480,669

16 Claims. (Cl. 29—455)

This invention relates to a method of making composite structural elements, light weight decking, heat exchangers, and the like in which a plurality of metal plates or sheets are disposed in flatwise spaced relation to each other and large groups of pins or other types of reinforcing or heat exchange fins are disposed between adjacent sheets so as to bridge the space therebetween, extend at an abrupt angle thereto, and are permanently bonded thereto.

For the purposes of illustration, the method will be described as applied to the manufacture of heat exchange cores, its application to other structural elements, such as light weight decking, "skin" for aeroplanes, and the like, being readily apparent from the illustrative example.

Heretofore, cores of this general character have been proposed. A relatively recent example of a heat exchange core of this general character is described in United States Patent No. 2,595,457, issued to Sven Holm et al. on May 6, 1952.

In accordance with the Holm patent, it is proposed to provide a heat exchanger in which, between certain pairs of adjacent metal sheets, sinuous wire elements are arranged with the opposite crests against the adjacent surfaces of the sheets, respectively, thus providing pin-like radiating fins. Between other pairs of adjacent metal sheets, metal channels are arranged, the channels being arranged with their bases against one of the associated sheets and with their sides disposed upright and bridging the space between the associated sheets to provide strip fins. These groups of pin fins and strip fins are arranged in alternate layers with thin metal sheets between the layers common thereto and separating them from each other, thus providing a composite "sandwich" of fins and sheets. In use, the heated products are passed into contact with the pins or fins in one layer and other products passed into heat exchange relation with the pins and fins of the layers between those in which the heated products are passed.

In the manufacture of such structures, however, considerable difficulty was encountered heretofore in providing an effective bond between the pins and strip fins on the one hand and their associated sheets on the other. The provision of an effective bond between the pins and sheets is greatly facilitated by providing series of connected pins as described in my United States Patent No. 2,678,808, issued May 18, 1954, and entitled "Sinuous Wire Structural and Heat Exchange Element and Assembly." Likewise, the provision of an effective bond between the strip fins and sheets is greatly facilitated by providing a grid of strip fins as described in my copending application Serial No. 480,668, filed January 10, 1955, and entitled Light Weight Structural Elements and Extended Surface.

Still remaining were the problems of facilitating the locating and assembling of the pins in position between the sheets prior to bonding them thereto and in maintaining them in proper position during the brazing operation.

In accordance with the present invention, it is desirable to form the pin fins as described in my above patent, to provide subassemblies or grids of strip fins as described in my above application, and then to assemble in a single article, both types of fins or either type only, with the separating sheets, and to bond them by brazing.

The first method which I employed for brazing the fins between metal sheets has proven satisfactory for many applications.

This first method comprised assembling of the rows of fins in bridging relation between sheets and with the individual fins extending at an abrupt angle to the sheets, a layer of braze material in the form of a metal foil being disposed between each face of each metal sheet and the fins to be joined thereto. Quite generally, the foil is copper or copper alloy. The fins and foil and sheets are cemented together by a cement employing a volatile solvent which evaporates below brazing temperature of the particular brazing material used and a solute which gasifies under brazing temperature in a reducing atmosphere and leaves neither gas nor any appreciable residue of solid material. In this manner, a firm braze can be made between the fins and the sheets. Any number of layers of fins with sheets therebetween can be provided. If strip fins are alternated side by side or in layers with pin fins, the same method of assembly can be followed. The assembly is then raised to brazing temperature in a reducing atmosphere, preferably by heating media applied unidirectionally, as is hereinafter explained.

This first method, while satisfactory for many purposes, nevertheless, has limitations. For example, there is a considerable change in dimension in a direction normal to the sheets when several layers of fins and sheets thus piled upon each other are heated to brazing temperature. This is due to the fact that, upon melting, the copper foil originally between the fins and sheets liquifies and flows out from between the fins and sheets except for capillary films. Each capillary film is considerably thinner than the original foil which it replaces and which may be several thousandths of an inch thick—for example, four thousandths. This changes the overall dimension normal to the planes of the metal sheets, or the height of the "sandwich," assuming that the stack is brazed with the intermediate metal sheets disposed horizontally.

Further, with this type of brazing material, as the temperature becomes greater than 1000° F., there is danger of the structure becoming disassembled.

Another objection resides in the fact that some brazing materials can be produced only in powder form at present so that the method is not of general applicability.

Accordingly, in those instances in which cores must be accurate in dimension, normal to the sheets—as where sealing walls and structural members are to be attached—I prefer to use a modified method.

According to my modified and preferred method, a plurality of rows of the required number of fins are assembled with the fins in generally upright position on the upper face of a flat horizontally disposed sheet and temporarily cemented thereto, if desired, after which a controlled amount of conventional brazing powder of the proper ingredients for the particular metals to be brazed is applied uniformly over the upwardly exposed surface of the sheets—or of the sheets and any ligaments joining the pins in the case of pin fins, such as described in my above identified patent. Any of the powder that remains on the upper ends of the fins and the faces of the upper ligaments is brushed off. Next there is applied over the distributed powder a cement including a volatile solvent which evaporates at low—preferably room temperature—and solute which completely gasifies so as to leave no appreciable residue at temperatures below brazing temperature, for example, at less than 1000° F., in a reducing atmosphere. This cement for the powder is one which is non-reactive with respect to the cement used for binding the fins to the sheet, or at least will not react with it sufficiently to weaken the bond during the normal time consumed in practising the method. The next sheet is laid on the upper ends of the fins, and the upper faces of the ligaments in case of the connected pin fins. Ordinarily it is not necessary to bond this sheet to the fins therebeneath but if such is desired for some special reason, the same type of cement used for cementing the pins to the lower sheet may be used.

Next a layer of pin fins or strip fins, as desired, is assembled on the top of the upper face of the last assembled sheet, using the last assembled sheet as the bottom sheet, and the steps heretofore described are repeated. These successive steps are continued until a sandwich is built up to the desired number of layers of pin fins, strip fins, or combinations thereof.

Thus, except for the temporary cement films in the case of pin fins, these surfaces of the fins and sheets which are to be brazed together are in contact. The cement films are reduced to negligible thickness under the pressure used in applying the fins and under the weight of the stack or sandwich. Consequently, after the fins and sheets are thus assembled, the sandwich is stable dimensionally in a direction normal to the sheets. Therefore, the structural and fastening elements required in the finished structure and which are to be permanently bonded to the sheets, are welded in place, thus giving the final dimensions desired.

Quite generally in these structures some of the spaces between sheets are to be closed at the sides or ends by metal sealing walls so as to prevent the escape of air and gases out of the spaces between the sheets other than at predetermined locations in the finished article. When such sealing walls are required, they preferably are placed in positions and welded also before brazing so as to obtain the advantages of the sealing effects of the brazing material on the welded joints and to eliminate the necessity of welding "braze-contaminated" surfaces.

When the assembly is complete, it is then inverted and subjected to brazing temperature in a reducing atmosphere as a result of which the solute of the cements is gasified and driven off or rendered innocuous to the braze, and the metal powder is initially sintered and held in place as the temperature of the sandwich rises. As the temperature gradually rises into the brazing range, this brazing material melts and in liquid form is drawn by capillarity in the form of capillary films in between the upwardly exposed surfaces of each group of pins, ligaments, and strip fins, on the one hand, and the downwardly exposed surfaces of the sheets which are juxtaposed on the fins and ligaments in the position in which the assemblage is being heated.

It is to be noted that the amount of brazing powder placed on the originally upwardly exposed face of a given sheet and the then juxtaposed ligaments, if any, is controlled so that there is an excess over that required for brazing the particular fins to that face of the sheet on which the brazing material was originally placed and which, now that the stack has been inverted, is the downwardly exposed face in each instance. When the capillary action at this downwardly exposed face is complete, therefore, the excess drains down the pins to, and is drawn by capillarity between the upper face of the lower sheet on the one hand and the now juxtaposed surfaces of the fins and ligaments, on the other.

The amount of excess is sufficient so that the latter capillary films are coextensive with the juxtaposed surfaces and so that slight fillets are formed at the junctures of the fins and ligaments with both sheets after allowance for the incidental amounts of brazing films formed on the faces of the fins and the areas of the sheets exposed between the rows of fins.

The brazing material may be any of these materials commonly used for brazing the particular metal. For low temperature heat exchangers, copper is satisfactory. For higher temperature exchangers, the usual nickel-chromium-boron mixtures may be used, the latter being particularly good for stainless steel but not available as a foil.

The cement used for fastening the pins or fins to the sheets is preferably a pressure sensitive adhesive and preferably one which is pressure sensitive to the metal itself so that only the contact surfaces of either the fins or the complementary surfaces of the sheet, but not both, need be coated. A suitable material is a butyl rubber and petro-naphtha solvent. In this the excess of solvent evaporates after the liquid is applied leaving a very thin adhesive film which is pressure sensitive to metal so that only one coat need be employed.

However, a synthetic rubber emulsified in water may be used. Such a composition is applied in liquid form and the excess water is caused to evaporate thereby leaving a film of pressure sensitive adhesive which remains pressure sensitive for long periods of time unless heated. This particular material, however, must be applied to both the fins and the sheets as it is only self-adhesive under pressure.

The cement used for cementing powder in place may be an aqueous solution of methyl cellulose or an acryloid cement. One source of the latter is Rohm and Haas, Inc. of New Jersey. A cement known as "Metacel" employing water as a solvent is also effective.

The particular cements used are unimportant so long as they are ones in which the solvent volatilizes readily and passes off easily as a gas and of which solutes decompose into gases in a reducing atmosphere at or below brazing temperatures and leave no appreciable residue, or of which the solutes do not deleteriously affect the braze produced. Generally the cements used for the fins and powder, respectively, are different and they must be such that they are not incompatible with each other in that the solvent of that last applied will not unduly soften or destroy the bond of the one first applied during the interval required for practise of the method.

In applying the powder and its cement it is preferable that the powder first be applied and distributed in dry condition and the cement then applied over the powder. By following this order any powder falling on the upwardly exposed surfaces of the fins which are to engage the next successive sheet superimposed thereon can be brushed off readily. Furthermore, by applying the cement after applying the powder, any maldistribution of the powder during application thereof can readily be rectified while the powder is dry.

For best results it is desirable that the cement used for the powder be mixed with a suitable wetting agent so as to facilitate the penetration by the cement of the layer of powder and also cause more prompt and effective wetting of the powder particles by the cement.

It is apparent that my latter and preferred method has distinct advantages in that it is generally applicable to all types of brazing compositions, large numbers of which cannot be obtained in foil form; there is no change in the dimension of the resulting brazed structure in a direction normal to the sheets such as would be caused by the insertion of foil between the fins and sheets prior to brazing; all connecting elements, including the sealing walls and the like, are welded to the clean metal structure without an interference of, and contamination by, brazing material; instead of the brazing material interfering with the weld, an excess of it may be allowed and the excess is drawn into any cavities or fissures in the welded joints between the sheets and closure walls and structural elements and the like by capillarity, thus sealing any leaks that otherwise might be present in the welded joints and strengthening the welds.

As mentioned, it is necessary that if combinations of layers of pins and metal strip fins are to be used, that a more effective metal strip fin be provided than the strips of metal formed into channel shaped cross section such as referred to in the Holm et al. patent. Further, it is important to prevent warpage during brazing, that the assembly be heated to brazing temperature in a more effective manner.

In order to illustrate my preferred method and these more specific improvements in the structure, reference is made to the drawings in which the assemblage and brazing of a specific structure is described for purposes of illustration and in which:

Figure 1 is a front elevation of a series of connected pins and a holding device therefor for holding the pins during the initial asemblage thereof on the metal sheets in accordance with the present invention;

Figures 2 and 3 are vertical and horizontal sectional views, respectively, taken on the lines 2—2 and 3—3, respectively, of Figure 1, parts thereof being shown in elevation for clearness in illustration;

Figure 5:
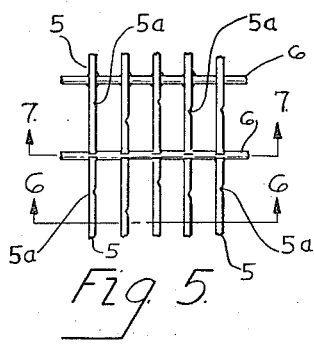
Figure 5 is a top plan view of the grid illustrated in Figure 4.
Figure 6:
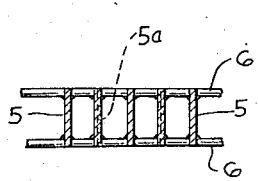
Figure 7:
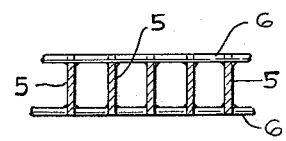
Figure 8:
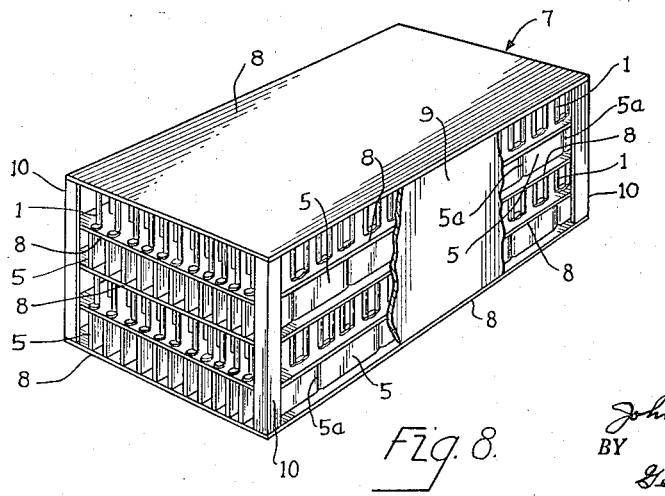
Figure 9:
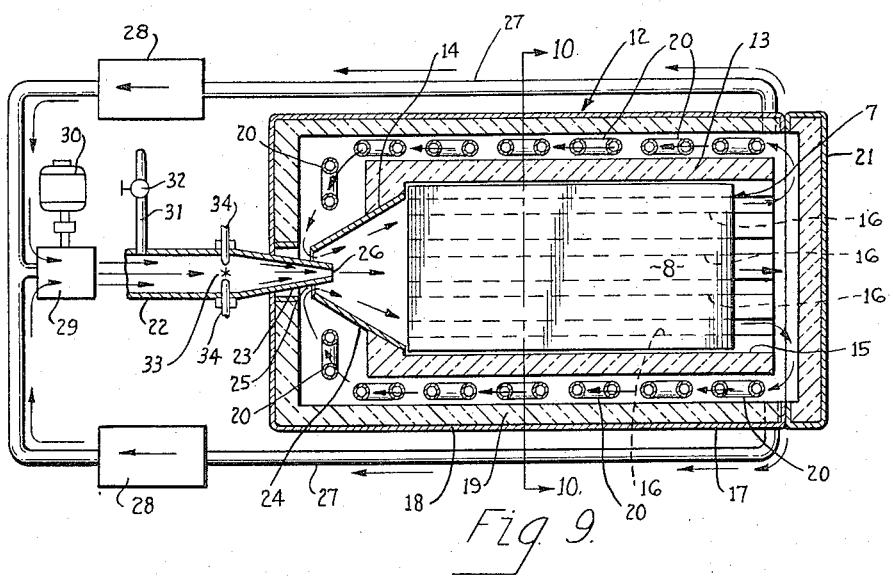
Figure 10:
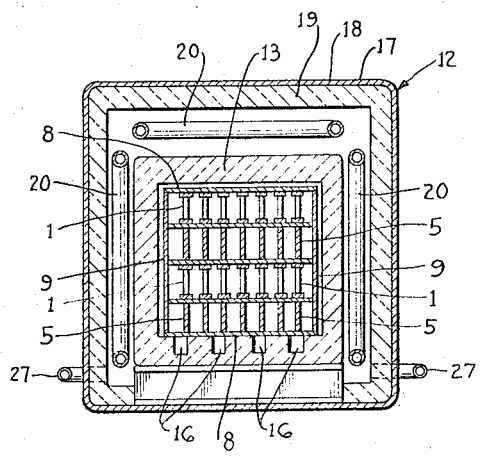

Figures 6 and 7 are sectional views taken on lines 6—6 and 7—7, respectively, of Figure 5;

Figure 8 is a perspective view illustrating the subassemblage in condition for brazing;

Figure 9 is a diagrammatic top plan view of a furnace or muffle structure with the assemblage therein showing one manner of application of heat to the assemblage; and Figure 10 is a vertical cross sectional view taken on the line 10—10 of Figure 9.

Figure 1:
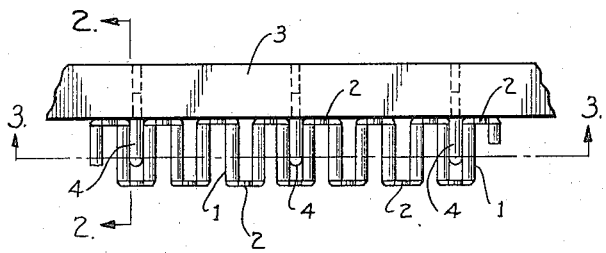
Figure 2:
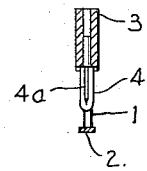
Figure 3:
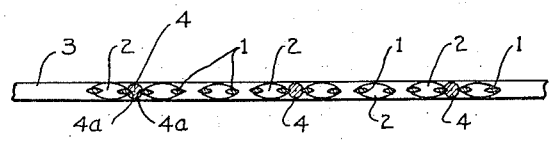
Figure 4:
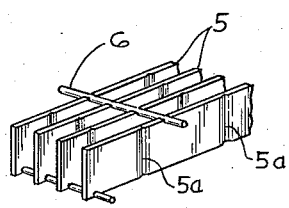
Figure 4 is a perspective view of a grid of strip metal fins which are to be incorporated in the illustrative form of a structure made in accordance with the present invention.

Referring to the drawings, the pins are preferably arranged in a series as described in my above identified Letters Patent, each series comprising a single row, as illustrated in Figure 1. As there shown and as described more fully in my above patent, each series comprises a plurality of pins 1 formed of a single length of wire having portions between adjacent pins flattened and widened to form readily bendable ligaments 2. Each wire is bent into sinusoidal form so as to dispose the ligaments 2 at the crests of the resultant corrugations with the pins 1 forming at the sides thereof. The advantages of pins arranged in this manner are well described in my above referred to patent.

The series of pins are to be assembled on the upper face of a sheet which is disposed horizontally. Since a larger number of rows of pins are to be disposed on the upper face of the sheet with the rows side by side, it is desirable that means be provided for gripping, holding, and positioning the series of pins in proper position as the series are disposed on the sheet.

For the purposes of picking up and transporting a plurality of rows of pins and positioning them on the upper face of a sheet, a series of holders 3 are provided. Each holder 3 comprises a stiff metal bar which extends lengthwise of the row of pins it is to support, and which is provided at intervals along its length with retaining fingers 4. The fingers 4 preferably are rounded in cross section and are provided with longitudinal grooves 4a facing endwise of the bar. Each finger 4 is arranged to pass between two adjacent pins with the edges of the pins engaging partway in the grooves 4a. The fingers 4 are spaced apart so as to engage only a few widely separated pins of the associated series. When the holder 3 is installed, a series of pins is frictionally held with the pins in accurate alignment endwise of the row and with opposite edges of the row generally planar and parallel to each other. Since the fingers 4 engage between only a few of the pins in the row at spaced intervals therealong, the holder 3 can readily be removed from the row when the row is cemented lightly to its associated sheet. Accordingly, by handling the holders 3 with their respective series of pins, and spacing them in the position desired, any number of rows can be arranged side by side in accurately spaced relation to each other laterally of the rows and all rows pressed firmly against the upper face of the sheet on which they are to be installed, thus causing them to be held accurately in position by the pressure sensitive adhesive previously applied either to the sheet or pin ends.

When the fins have been pressed firmly against the sheets and caused to adhere, the holders 3 are withdrawn.

Next, brazing powder is dusted between the pins onto the upper face of the sheet and upper faces of the ligaments in a quantity in excess of the amount required for holding the pins and ligaments to the upwardly exposed face of the sheet and for forming small fillets at the junctures with that face, and preferably at least twice that amount, plus a sufficient allowance for brazing films which form on the exposed non-contacting surfaces of the fins and faces of the sheets. Next, any powder remaining on those surfaces of the fins and upper ligaments which are to contact the next superimposed sheet is brushed off.

The powder applied is generally uniformly distributed over the surfaces to which applied, or between the rows so that it can flow uniformly to all points where it is required. Next, the cement for the powder is applied over the distributed powder, by spraying or in any suitable manner in a sufficient quantity to penetrate the powder layer and bond it to the fins and sheet. A second, or next successive sheet is then laid on the top of the fins. Next, employing the upper face of the second sheet as the base sheet, additional pins or fins are installed in the manner described. Thus, successive layers to the extent desired are built up.

If layers of strip fins are to be alternated with layers of pin fins, it is most convenient to provide strip fins such as more fully described in my above mentioned copending application Serial No. 480,668, filed January 10, 1955. A grid of strip fins such as disclosed therein is illustrated in Figures 4 through 7 and comprise a grid which is made up of a plurality of thin strips of metal 5, the strips 5 being arranged side by side in flatwise spaced parallel relation. At intervals along their length, suitable upper and lower transverse cross ties, such as wires, or rods, as indicated at 5a are provided. The wires 6 are bonded to the strips 5 at the upper and lower edges of the strips by welding and preferably under sufficient pressure so that the wires mash into the margins of the strips edgewise of the strips. The wires are so disposed that they do not extend outwardly edgewise of the strips beyond the planes of the faces of the grid defined by the edges of the assembled strips. The wires 6 are preferably about the same diameter as the thickness of the strips 5 or do not extend that thickness. The cross section of the wire 6 is such that the wire is relatively rigid in lengths equal to the distance between adjacent strips 5. In an assembly in which the strip fins 5 are of metal of 40 thousandths of an inch in thickness and are ⅜" high and spaced ¼" apart flatwise the wires 6 at the upper edges of the strips 5 may be spaced apart about 4" from each other lengthwise of the strips and the wires 6 at the lower edge of the strips correspondingly spaced from each other. Preferably the wires at one face of the grid of fins are offset endwise of the strips from those at the opposite face. Strips of this nature form grids which are sufficiently rigid for handling and installing and which leave exposed large surface areas of the sheet on which they are supported, the only surface of the sheet covered by the fins being surfaces corresponding to the edges of the individual strips, and occasional wires 6. Accordingly, any brazing powder sprinkled over the sheets is not entrapped in inoperative position in channels as it would be in strip fins of channel shaped cross section as described in the Holm et al. patent. Instead, the brazing powder is free, when liquified, to flow by capillarity between the edges of the strips and the faces of the sheet.

The strips 5 may have their faces notched transversely at spaced intervals, as indicated at 5a and as described in my last mentioned copending application, to facilitate heat exchange by eliminating or reducing laminar flow.

The strip fins are installed using the same procedure as used for installing pin fins except that holders are unnecessary as each grid of strip fins can be handled as a unit.

After a sandwich or core, indicated generally at 7, has been built up by the placing of alternate layers of pins 1 and fins 4 between sheets 8, any metal sealing side walls, such as walls 9, may be disposed alongside such layers as desired and secured in place by welding. Additional structural and corner connecting members 10 may be secured to all of the sheets of the sandwich, thus fixing its dimensions in a direction normal to the planes of the sheets. Such closure walls 9 and structural members 10, if desired, may be welded to the sheets 8. With the sandwich 7 in this condition it is inverted and heated as hereinbefore described.

Difficulties are sometimes encountered with pressure sensitive cements in that they permit gradual creepage if the parts bonded thereby are under a relatively light but continuous stress. Thus, if rows or series of pins are subject to internal stresses tending to warp them out of their straight condition they will creep, despite the pressure sensitive cement, until the spaces between the rows vary greatly in width.

In some cases a pin fin series, which series comprises a single row of pins 1 with their connecting ligaments 2, is not straight as it issues from the forming machine but on the contrary is sometimes warped or curved transversely of the row, due to internal strains created during forming. Such a series can be annealed to relieve the strains and made perfectly straight but, in most cases, it is desirable to dispense with the annealing operation so that each series can be used in the condition in which it issues from the forming machine.

In the latter case, the holders 3 are arranged with the fingers 4 spaced apart endwise of the row a distance such that as a series of pins is picked up by the holder by inserting the fingers 4 progressively from one end of the row to the other, the row is elongated slightly and is placed under very slight endwise tension distributed somewhat uniformly along the row. Thus, in the form illustrated in Figure 1, the left hand finger 4 and the one next adjacent to it to the right may be spaced apart very slightly more than the distance which would be required to accommodate the six pins 1 therebetween were the pins spaced exactly the theoretical distance apart desired. While held in this condition, each holder and its associated series of pins are placed in position on a sheet 8 and the end pins or end ligaments of the row are spot or tack welded to the sheet. This welding alone helps to eliminate creepage and warpage of the rows in the case of pressure sensitive cements.

However, instead of pressure sensitive cements, quick setting cements may be used in which case, after the tack welding, temporary spacing strips or blocks are placed cross-wise of the rows at frequent intervals where needed so as to space the rows apart accurately transversely of their length prior to cementing them in place.

A quick setting cement of suitable type, such as ordinary lacquer, may then be sprayed on the sheet to hold the rows in position. After this cement has set, the holders are removed and the brazing powder is applied and cemented in place. The binding effect of the cement and of the set crusted brazing powder applied to the plates secures the rows of pins accurately in position, even though the juxtaposed surfaces of the pins, ligaments and sheets are unbonded, after which the spacers can be removed.

Whether cement is applied to the sheets 8 and the pins are applied to it so that the juxtaposed surfaces of the pins and sheets are bonded directly together by the cement, or the pins are held in place with their juxtaposed surfaces unbonded to the sheets but by cementitious films engaging only the peripheries of the ligaments and pins, the fins are considered to be cemented in place.

Since there is a considerable mass in many of these sandwiches, consideration must be given to the manner of heating. For example, the core described may be 40" wide by 72" long by 32" deep, weigh two tons, and employ about four million pins. It is apparent that in the heating of such a mass rapidly, problems are introduced due to differentials in heat conduction and in expansion.

Accordingly, by an apparatus more fully described in my copending application Serial No. 353,789, filed May 8, 1953, and entitled Heat Treating Muffle Furnace, now U.S. Patent No. 2,809,822, issued October 15, 1957, the heat is applied to the assembled structure unidirectionally from one end so as to give a unidirectional gradient of heating, preferably in the direction of the longest dimension.

As illustrated in the drawings, the assemblage 7, in the inverted position described, is enclosed in a suitable furnace 12.

The furnace 12 comprises an inner shell 13 of refractory heat insulating material. The shell 13 has an inlet port 14 at one end and through which inert heating gases are introduced. The shell is open at the other end, as indicated at 15, to permit escape of the inert gases and removal of the charge.

In its bottom wall, the shell 13 is provided with upwardly open channels 16 which extend endwise of the shell and permit the insertion of lifting prongs for lifting the charge from the shell 13. The shell 13 is preferably of a size to fit and confine the charge rather closely with just sufficient clearance to permit its removal therefrom readily through the open end 15. The furnace also comprises an outer muffle 17 in which the shell 13 is enclosed. The muffle 17 includes a metal casing 18 and inner lining of insulation 19. Heating means in the form of heating coils 20 are provided in the muffle 17 inwardly of the insulating wall 19 thereof. The shell 13 fits within the muffle so that the shell 13 is surrounded by the coils 20. The muffle 17 is closed at the end 15 of the shell by a removable door 21. At the opposite end, the muffle 17 is provided with an injection device 22 for recirculating heating media in the muffle 17 and through the shell 13.

The device 22 is in the form of a nozzle 23 arranged for delivery of a high velocity jet and an expanding nozzle 24. The larger outlet end of the nozzle 24 opens into the shell 13 and is preferably coextensive in size with the interior cross section of the shell 13. The wall defining the smaller inlet end of the expansion nozzle 24 is spaced from a periphery of the nozzle 23 so as to provide an annular space 25 therebetween for the induction of heating media from the space between the shell 13 and inner wall 19 which induced gases, along with the motivating gases issuing from the orifice 26, pass into, and endwise through the shell 13 and discharge from the end 15 of the shell into the space between the shell and the wall 19 of the muffle. These gases thereupon recirculate continuously rapidly between the shell and muffle wall, passing the coils 20 by which they are heated once for each circulation.

As is known, it is difficult to pump gases at the brazing temperature required in the muffle. Accordingly, adjacent the end 15 of the shell 13 suitable take-off pipes 27 are connected to the interior of the muffle. These pipes lead to coolers 28 which, in turn, lead to a pump 29 driven by a motor 30. The coolers operate to cool the gases withdrawn from the muffle sufficiently so that they can be pumped by the pump 29. Only a relatively small proportion of the recirculating gases are drawn off in this manner.

A pipe 31 controlled by valve 32 is connected with the device 22 and leads to a suitable reserve supply of inert gas which may be bled into the injection device 22 to supply that lost by leakage.

In order to build up the velocity required at the orifice 26, heat is generated directly in the relatively small volume of cooled inert gases fed by the pump 29 to the nozzle 23. This is accomplished by means of an arc 33, provided by electrodes 34, which extend into the interior of the nozzle 23 at a point shortly in advance of the discharge orifice 26. The arc 33 develops an exceedingly high temperature directly in the gas in the nozzle 23 by ionization. This heats the gas so rapidly to such a high temperature that a considerably increased volume is discharged at high velocity through the orifice 26. Thus the amount of gas which must be circulated through the coolers to the injection device is relatively small compared to that which is recirculated in the muffle.

As a result of the use of the arc and the generation of heat directly in the gases themselves in the injection device 22, a very rapid expansion of the gases is obtained with a consequently extremely high orifice velocity.

Instead of the mass or assemblage 7 being heated by heat travelling from the top, bottom, sides and ends toward the center of the mass, it is heated from one end uniformly over its entire cross section toward its other end with a temperature which is uniform transversely of the assemblage both vertically and horizontally and which decreases endwise only thereof. The insulating wall of the shell 13 prevents heating of the sandwich from heat applied exteriorly to the sides, top and bottom of the sandwich. Accordingly, the expansion and contraction are unidirectional endwise of the assemblage. As a result, the structure can be heated very rapidly without warping and twisting.

Having thus described my invention, I claim:

1. The method of securing a multiplicity of bridging elements between flatwise spaced metal sheets with the elements in a position in which they are in closely spaced relation to each other laterally of the elements and are at abrupt angles to the planes of the sheets and comprising: assembling and temporarily bonding a multiplicity of bridging elements in said position on one face of a first one of the sheets, applying to, and temporarily bonding on, areas of the said one face exposed between the elements and to any exposed surfaces of the element which surfaces are near to the plane of said one face brazing material in comminuted form in an amount appreciably greater than required for brazing the elements to said one face, applying a second one of the sheets on the assembled elements at the opposite face of the assembly, positioning the resultant assembly with said second sheet at the bottom and first sheet at the top with the said one face on the underside and the brazing material retained thereon and, while holding the sheets and elements assembled in the latter position with the brazing material so retained, subjecting them to brazing temperature to cause part of the brazing material to liquify and flow by capillarity in between said one face of the first sheet and the areas of the elements juxtaposed on the first sheet and part to drain down the elements and flow in between the said second sheet and the areas of the elements juxtaposed on the second sheet.

2. The method of securing a multiplicity of bridging elements between flatwise spaced metal sheets with the elements in a position in which they are in closely spaced relation to each other laterally of the elements and are at abrupt angles to the planes of the sheets and comprising: assembling a multiplicity of bridging elements in said position on one face of a first one of the sheets, disposing said first sheet with the assembled elements thereon with said one face upwardly and while so disposed applying to areas of said one face which are exposed between the elements and to any upwardly exposed surfaces of the elements which surfaces are near the plane of said one face, comminuted brazing material in an amount greater than required for brazing the elements to the first sheet and also a liquid cement, causing the cement to set so as to bond to said first sheet and bridging elements, and to hold the material in place temporarily thereon, applying a second one of the sheets on top of the assembled elements, inverting the assembly of elements and sheets and thereby disposing said first sheet on top with said one face on the underside and with the brazing material retained on said one face, and subjecting them to brazing temperature while they are so held in the assembled relation and inverted position, to cause part of the brazing material to liquefy and flow by capillarity in between said one face of the first sheet and the areas of the elements juxtaposed on said first sheet and part to drain down the elements and flow, by capillarity, in between the said second sheet and the areas of the elements juxtaposed on the said second sheet, and the amount of brazing material being at least sufficient for entering by capillarity between the elements and the underside of the sheet on which it is supported and with an excess over that amount sufficient to drain down and enter by capillarity between said second sheet and the areas of said elements juxtaposed on the second sheet.

3. The method according to claim 1 wherein said temporary bonding of the elements to the first sheet and the temporary bonding of the brazing material is by means of cement.

4. The method according to claim 3 wherein the cement for bonding the elements to the first sheet is a different cement and the cement for bonding the braze material.

5. The method according to claim 1 characterized in that said second sheet and first sheet are secured together by structural elements permanently welded to each of them prior to the brazing operation and the amount of brazing applied to the first sheet is sufficient to braze both sheets to the elements and to seal any joints between the sheets and structural elements and fissures in the welds with the brazing material, during said brazing operation.

6. The method according to claim 4 characterized in that said second sheet is secured in place by cementing it to the elements.

7. The method according to claim 4 characterized in that each of the preselected cements used consists of a volatile solvent and a solute which, when subjected to brazing temperatures, leaves no substantial amount of residue in the braze.

8. The method according to claim 4 characterized in that the preselected cement for the brazing material is one which, during the assembly, will not soften appreciably the preselected cement used for cementing the sheets and elements in position after the latter preselected cement has set.

9. The method according to claim 4 characterized in that said first mentioned preselected cement is a pressure sensitive cement.

10. The method of securing a multiplicity of bridging elements between flatwise spaced metal sheets with the elements in a position in which they are in closely spaced relation to each other laterally and at abrupt angles to the planes of the sheets and comprising: assembling and temporarily bonding a multiplicity of bridging elements in said position on one face of a first one of the sheets, holding said first sheet with said one face exposed upwardly applying and temporarily bonding by cement to the areas of the said one face exposed between the elements, and to any surfaces of the elements which surfaces are exposed in the same direction as said face and near the plane of said face, comminuted brazing material in an amount appreciably greater than required for brazing the elements to said one face, then, while holding said one sheet with said one face exposed upwardly, applying a second one of the sheets on the assembled elements at the opposite face of the assembly, whereby the outer face of the second sheet is exposed away from the assembly, and, while said one sheet remains with said one face exposed upwardly, repeating the foregoing steps successively with the upper face of each last added sheet having a multiplicity of the elements bonded, in said first mentioned position, thereon, until a structure is assembled which comprises a plurality of flatwise spaced sheets with laterally spaced bridging elements extending between each sheet and those next adjacent to it, positioning said assemblage with the first sheet at the top and last added sheet at the bottom and, while holding the sheets and elements assembled with the brazing material on the undersides of the sheets, subjecting them to brazing temperature, to cause part of the brazing material on the under face of each sheet to liquefy and flow by capillarity in between the under face of that sheet and the areas of the elements juxtaposed thereagainst and part of it to drain down the elements and flow by capillarity in between the upper surface of the next sheet therebelow and the areas of the elements juxtaposed on said next sheet therebelow, and the amount of brazing material being at least sufficient for entering by capillarity between the elements and the underside of the sheet on which it is supported and with an excess over that amount sufficient to drain down and enter by capillarity between said second sheet and the areas of said elements juxtaposed on the second sheet.

11. The method according to claim 10 characterized in that before subjecting the assemblage to brazing temperature, structural elements are permanently fastened to the sheets so as to mechanically hold them in assembled position.

12. The method according to claim 10 characterized in that said heat is applied to said assembly by introducing heated gases between adjacent sheets at one end of the assembly and constraining substantially all of the gases to flow as a stream coextensive in width with the assemblage, endwise through the assemblage for the full length of the assemblage and discharge out of the other end of the assemblage.

13. The method according to claim 10 characterized in that said heat is applied to said assembly by introducing heated gases between the sheets at one end, constraining substantially all of the gases to flow as a stream coextensive in width with the assemblage, endwise through the assemblage for the full length of the assemblage and discharge out of the other end of the assemblage, and the sides, top and bottom of the assemblage are maintained thermally insulated to prevent escape of heat therefrom transversely of the length thereof and to prevent application of heat thereto from the exterior of the assemblage.

14. The method according to claim 13 characterized in that the gases discharged from the said other end of the assemblage are constrained to enter repeatedly through said one end and recirculate through the assembly while so thermally insulated from the sides and bottom.

15. The method according to claim 10 characterized in that said assembly is heated unidirectionally from one end toward the other so that its heat gradient slopes downwardly from the inlet to the outlet end and is uniform laterally at each point endwise of the assembly.

16. The method according to claim 10 characterized in that after the assembly is heated it is cooled by inducing cooling gaseous media between adjacent sheets at one end of the assembly and constraining substantially all of the cooling gaseous media to flow as a stream coextensive in width with the assemblage endwise through the assemblage for the full length of the assemblage and discharge out of the other end of the assemblage and the sides, top and bottom of the assemblage are maintained thermally insulated to prevent escape of the cooling media and heat therefrom transversely of the length of the assemblage.

References Cited in the file of this patent

UNITED STATES PATENTS

| | | |
|---|---|---|
| 1,662,302 | Croese | Mar. 13, 1928 |
| 1,896,789 | Scott | Feb. 7, 1933 |
| 1,922,063 | Vaughn | Aug. 15, 1933 |
| 2,389,175 | Woods | Nov. 20, 1945 |
| 2,406,051 | Weiss | Aug. 20, 1946 |
| 2,443,577 | Finlay | June 15, 1948 |
| 2,451,783 | Sweeney | Oct. 19, 1948 |
| 2,461,878 | Christensen | Feb. 15, 1949 |